3,184,464
TETRAHYDRO-QUINOLINES AND TETRAHYDRO-ISOQUINOLINES
Erich Haack, Heidelberg, Adolf Hagedorn, Mannheim-Waldhof, Felix H. Schmidt, Mannheim, and Rudi Weyer, Frankfurt am Main Hochst, Germany, assignors to C. F. Boehringer & Soehne G.m.b.H., Mannheim-Waldhof, Germany, a German corporation
No Drawing. Filed Sept. 11, 1962, Ser. No. 222,954
Claims priority, application Germany, Sept. 16, 1961, B 64,036
4 Claims. (Cl. 260—287)

This invention relates to novel tetrahydro-quinolines and tetrahydro-isoquinolines having utility as pharmacodynamic agents and more particularly to the tetrahydro-quinolines and tetrahydro-isoquinolines of the following structural formulae:

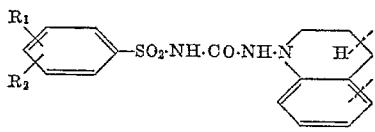

and

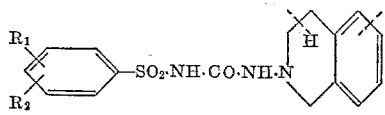

and the salts thereof, wherein $R_1$ and $R_2$ each represents one of hydrogen alkyl, alkoxy, alkyl-mercapto, alkenyloxy, halogen, trifluoro-methyl, cyano, azido, amino, or acyl.

The novel tetrahydro-quinolines and tetrahydro-isoquinoline compounds of this invention have particular utility as blood-sugar reducing agents and have a minimum of side effects.

It is known that various benzene-sulfonyl-ureas demonstrate blood-sugar level reducing properties and are suitable for oral administration as anti-diabetic agents (see for example Arzeimittel-Forschung, volume 8, pages 448–454 (1958)). In particular $N_1$-sulfanilyl-$N_2$-(n-butyl)-urea and $N_1$-(4-methyl-benzene-sulfonyl)-$N_2$-(n-butyl)-urea have become of considerable importance in the therapy of diabetes mellitus.

A primary object of the invention is the development of a new group of therapeutically useful chemical compounds.

A further object of the invention is the development more particularly of a group of chemical compounds characterized by blood sugar reducing activity.

In accordance with the invention, it has now been found that the foregoing and other objects which will be manifest to the skilled in the art from the following description are realized in unsubstituted and substituted tetrahydro-quinolines and tetrahydro-isoquinolines which are linked at the nitrogen atom thereof with a benzene-sulfonyl-urea radical. These compounds are characterized by a very marked blood sugar reducing effect and can be administered even over long periods with little danger of side effects. Their excellent tolerance makes it possible to employ this class of compounds as anti-diabetic agents in a broad range of concentrations for considerable periods and with variations in the amounts administered tailored to the individual, his disease and other conditions.

More specifically the novel tetrahydro-quinolines and tetrahydro-isoquinolines of this invention are represented by the following formulae:

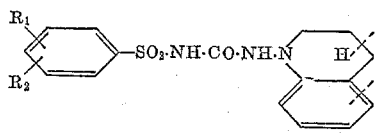

and

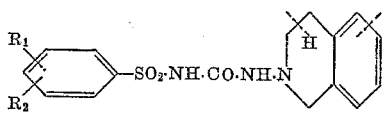

and the salts thereof, wherein $R_1$ and $R_2$ each represents one of hydrogen, alkyl, alkoxy, alkyl-mercapto, alkenyloxy, halogen, trifluoromethyl, cyano, azido, amino, or acyl.

The compounds in accordance with the invention may also contain substituents on the quinoline or isoquinoline group bound to the nitrogen atom such as for example of the type of $R_1$ and $R_2$ (above defined). Preferably the quinoline or isoquinoline is substituted with at least one solubility increasing group.

The compounds of this invention are prepared by the following synthetic routes:

(a) Conversion of an N-amino-tetrahydro-quinoline and N-amino-tetrahydro-isoquinoline with a benzene-sulfonyl compound having the following formula:

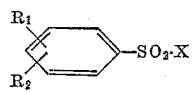

in which X designates an isocyanate group or a group which under the ensuing reaction conditions is converted into an isocyanate group.

As starting materials in the above synthesis, there are preferably employed benzene-sulfonyl-urethanes, and benzene-sulfonyl-ureas as well as thio-urethanes, carbamic-acid-halides and acylated ureas, the use of a starting material not containing an isocyanate group being predicated on the ability of the material to form isocyanate groups in the reaction.

(b) Conversion of benzene-sulfonamides or their salts, the free base having the formula:

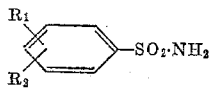

with an N-urea-derivative of tetrahydro-quinoline or tetrahydro-isoquinoline.

(c) Conversion of benzene-sulfonyl-halides having the formula:

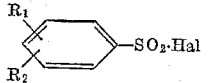

with an N-urea derivative of tetrahydro-quinoline or tetrahydro-isoquinoline.

In the conversion of benzene-sulfonyl halides with an N-urea-derivative of tetrahydro-quinoline or tetrahydro-isoquinoline, there may be used in place of the semicarbazide, the corresponding parabanic acid derivatives.

(d) Hydrolysis of a substitute tetrahydro-quinoline or tetrahydro-isoquinoline substituted at the nitrogen atom with the radical of a benzene-sulfonyl thiourea having the formula:

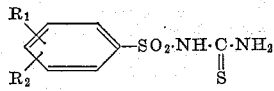

or by the benzene-sulfonyl-amino-guanidine radical of:

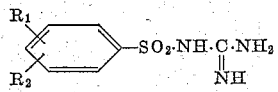

The hydrolysis in the first instance is advantageously carried out using nitrous acid, while the hydrolysis of the guanidine compound takes place with particular ease under the use of hydrochloric acid.

The blood sugar lowering compounds of this group of sulfonyl semicarbazide compounds according to the present invention are capable of forming alkali metal, alkaline earth metal, and ammonium salts, and especially potassium, sodium, and magnesium metal salts, as well as salts with various organic amines which are compatible to the human system. Such salts are prepared in the usual manner, for instance, by adding a metal hydroxide to the sulfonyl semicarbazide compounds: these semicarbazide compounds are relatively strong acids. It is also possible to produce salts with organic bases which are compatible to the human system in the amounts administered.

The salts set forth herein are useful in the treatment of diabetes in like manner as the compounds set forth herein.

The following examples illustrate in more detail the present invention, without, however, limiting it thereto:

Example 1

A solution of 23 g. p-toluene-sulfonyl-urethane (0.1 mol) in 250 ml. absolute toluene is treated with 15 g. N-amino-tetrahydro-quinoline (0.1 mol). The mixture is first stirred for 30 minutes at room temperature and then heated to boiling for 80 minutes under stirring and reflux-cooling. The moist crystal mass separated after cooling is drawn-off by suction and washed with cold toluene. Following treatment of the crystals with methanol, the crystals have a melting point of 173–176° C. $N_1$ - (p - methyl - benzene - sulfonyl) - $N_2$(N - tetrahydro-quinolyl)-urea is recovered in a yield of 33.9 g. (92% of theory).

Under substantially the same conditions, there is recovered by conversion of N-amino-tetrahydro-isoquinoline, $N_1$-(p-methyl-benzene-sulfonyl)-$N_2$-(N-tetrahydro-isoquinoline) urea having a melting point of 200–203° C. in a yield of 32.6 g. (94% of theory).

Example 2

A solution of 7.8 g. p-chloro-benzene-sulfonyl-urea in 120 ml. dioxane is heated to boiling with 4.5 g. N-amino-tetrahydro-isoquinoline for one hour under reflux. The solvent is evacuated in vacuum, and the residue taken up with 1% ammonia. The resulting solution is treated with charcoal, and after filtration acidified with acetic acid whereby $N_1$-(p-chloro-benzene-sulfonyl)-$N_2$-(tetrahydro-isoquinolyl)-urea separates out. The $N_1$-(p-chloro-benbene-sulfonyl)-$N_2$-(tetrahydro - isoquinolyl) - urea is dissolved and reprecipitated from a dilute ammonium-acetate solution and thereafter recrystallized from ethanol. The compound obtained melts at 217–220° C. The yield is 9.9 g. (about 90% of theory).

In a completely analogous manner, $N_1$-(p-chloro-benzene-sulfonyl)-$N_2$-(N-tetrahydro-quinonyl)-urea having a melting point of 213–216° C. is obtained and a yield of 10 g. (91.6% of theory).

Example 3

7.1 g. N-(p-methoxy-benzene-sulfonyl)-$N_2$-acetyl-urea are treated with 4.5 g. N-amino-tetrahydro-quinoline. On the application of heat, salt formation sets in. The product which is separated is heated in an oil bath to about 130° C. and after several minutes a clear melt is obtained. Following cooling, the reaction cake is extracted with 1% ammonia solution. The undissolved constituents are filtered off, and the remaining solution acidified with acetic acid. $N_1$(p-methoxy-benzene-sulfonyl)-$N_2$-(N-tetrahydro-quinolyl)-urea is obtained which melts following redissolution and reprecipitation from a dilute ammonium-acetate solution. The product on recrystallization from ethanol has a melting point of 183–184° C. The yield amounts to 10.1 g. (92% of theory).

In the same manner by any alternative method disclosed in the above specification, $N_1$(p-methoxy-benzene-sulfonyl)-$N_2$-(N-tetrahydro - isoquinolyl) - urea having a melting point of 187–189° C. can be prepared.

The end products of this invention may be combined with a pharmaceutical carrier for administration to humans in an amount to obtain the desired pharmacodynamic effect, i.e. blood-sugar level reducing effect. Such carriers are either solid or liquid and are preferably solid. Exemplary of solid pharmaceutical carriers are lactose, corn starch, manitol, talc, etc. The compounds of this invention are mixed with the carrier and built into hard gelatin capsules or tableted with suitable tableting aids, such as for example magnesium stearate, starch, or other lubricants, disintegrants or coloring agents. If combinations with a liquid carrier are desirable, a soft gelatin capsule is filled with a slurry of the novel compounds in a suitable liquid carrier.

We claim:

1. A chemical compound selected from the group consisting of free bases and their non-toxic organic and inorganic acid addition salts, the free bases having the formulae:

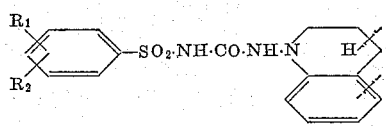

and

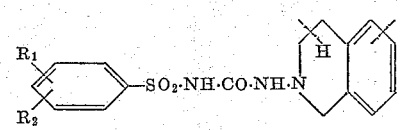

wherein $R_1$ and $R_2$ each represents a member selected from the group consisting of hydrogen, lower alkyl, lower alkoxy, and halogen.

2. $N_1$ - (p - methyl -benzene - sulfonyl) - $N_2$ - (N-tetrahydro-quinolyl)-urea.

3. $N_1$ - (p - chloro -benzene - sulfonyl) - $N_2$ - (tetrahydro-quinolyl)-urea.

4. $N_1$ - (p - methoxy - benzene - sulfonyl) - $N_2$ - (N-tetrahydro-quinolyl)-urea.

References Cited by the Examiner

UNITED STATES PATENTS

| | | | |
|---|---|---|---|
| 2,844,510 | 7/58 | Lorenz et al. | 167—65 |
| 2,951,078 | 8/60 | Biel | 260—286 |
| 2,955,073 | 10/60 | De Beer | 167—65 |
| 3,015,673 | 1/62 | Zahler | 260—553 |
| 3,021,368 | 2/62 | Blank | 260—553 |
| 3,041,331 | 6/62 | Wright | 260—239 |
| 3,051,715 | 8/62 | Biel et al. | 260—286 |
| 3,063,903 | 11/62 | Wright | 260—553 |

IRVING MARCUS, *Primary Examiner.*

WALTER A. MODANCE, *Examiner.*